(12) United States Patent
Jimenez et al.

(10) Patent No.: US 12,206,085 B2
(45) Date of Patent: Jan. 21, 2025

(54) APPLICATION OF POROSITY-CONTROLLED LITHIUM METAL COATING

(71) Applicant: GM GLOBAL TECHNOLOGY OPERATIONS LLC, Detroit, MI (US)

(72) Inventors: Niccolo Jimenez, Troy, MI (US); Michael P. Balogh, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 707 days.

(21) Appl. No.: 17/459,407

(22) Filed: Aug. 27, 2021

(65) Prior Publication Data
US 2023/0068715 A1 Mar. 2, 2023

(51) Int. Cl.
| | |
|---|---|
| H01M 4/00 | (2006.01) |
| H01M 4/04 | (2006.01) |
| H01M 4/1395 | (2010.01) |
| H01M 4/38 | (2006.01) |
| H01M 4/66 | (2006.01) |

(Continued)

(52) U.S. Cl.
CPC ....... *H01M 4/0419* (2013.01); *H01M 4/0404* (2013.01); *H01M 4/1395* (2013.01); *H01M 4/382* (2013.01); *H01M 4/661* (2013.01); *H01M 4/663* (2013.01); *H01M 10/0525* (2013.01); *H01M 2004/021* (2013.01)

(58) Field of Classification Search
CPC .. H01M 4/04; H01M 10/0525; H01M 4/1395; H01M 4/38; H01M 4/66
See application file for complete search history.

(56) References Cited

U.S. PATENT DOCUMENTS

2012/0141665 A1* 6/2012 Kim ................. B41F 17/26
427/97.5

FOREIGN PATENT DOCUMENTS

| CN | 104919075 A | * | 9/2015 | ............. B05B 7/226 |
| JP | 2021034227 A | * | 3/2021 | ............. B05D 1/02 |
| WO | WO-2018105700 A1 | * | 6/2018 | ............. B22F 1/0062 |

OTHER PUBLICATIONS

Kadosawa et al., Plasma Spraying Device and Method for Manufacturing Battery Electrode, Jun. 2018, See the Abstract. (Year: 2018).*

(Continued)

*Primary Examiner* — Niki Bakhtiari
*Assistant Examiner* — Monique M Wills
(74) *Attorney, Agent, or Firm* — Quinn IP Law

(57) ABSTRACT

A method of manufacturing a component having a porosity-controlled lithium metal coating includes setting up an aerosol spray apparatus having a material feeder and a confinement conduit in fluid communication therewith. The confinement conduit has an inlet end and a nozzle end. The method also includes setting up a substrate having an exposed surface on a moveable tooling plate and directing the nozzle end at the exposed surface. The method additionally includes loading a lithium metal into the material feeder. The method also includes feeding a high-pressure gas into the inlet end of the confinement conduit to thereby form an aerosol spray of lithium metal. The method further includes moving the tooling plate to regulate a thickness and a pattern of deposition of the lithium metal onto the exposed surface through the nozzle end to thereby generate a porous lithium metal coating on the substrate.

20 Claims, 3 Drawing Sheets

(51) Int. Cl.
H01M 10/0525 (2010.01)
H01M 4/02 (2006.01)

(56) References Cited

OTHER PUBLICATIONS

Forster et al., Manufacturing Based on Solid to at Least One Layer of Thin-film Battery, the Plasma Powder Spray Gun and Solid-based Film Battery, Sep. 2015, See the Abstract. (Year: 2015).*
Matsunaga, Battery Manufacturing Method and Battery, Mar. 2021, See the Abstract. (Year: 2021).*

* cited by examiner

FIG. 2
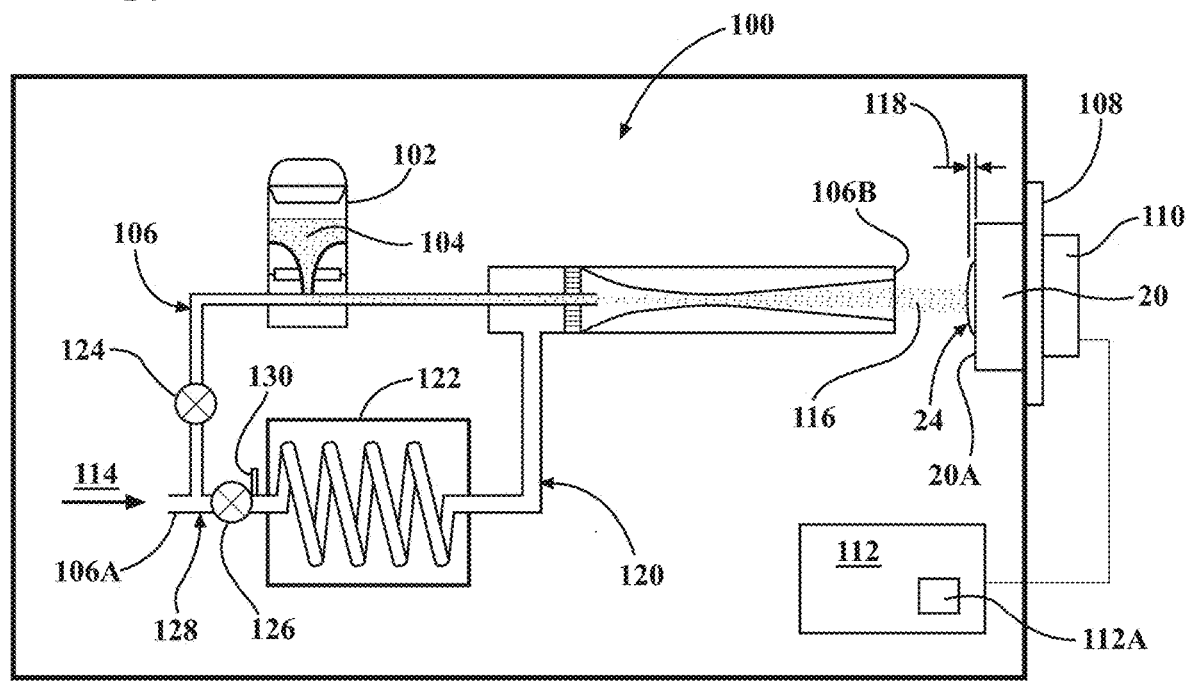
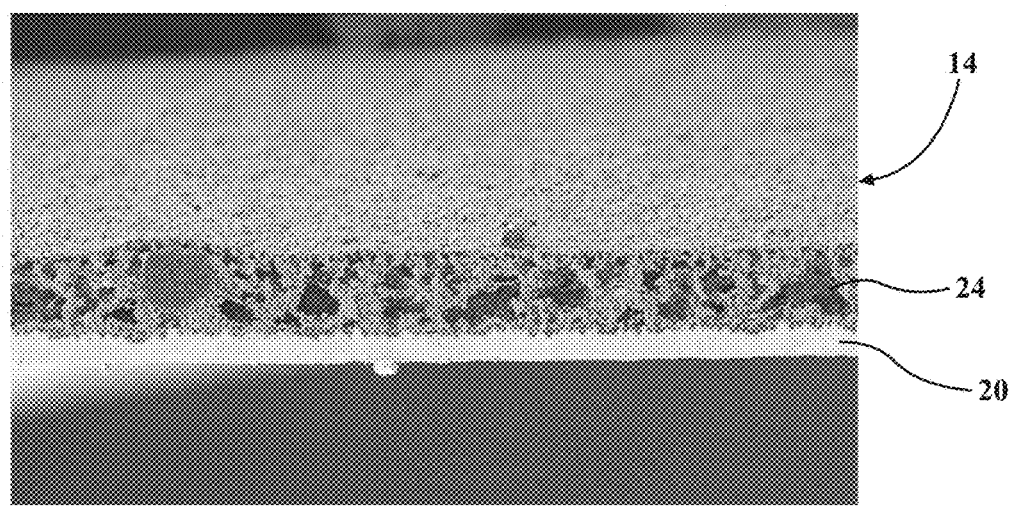
FIG. 3

APPLICATION OF POROSITY-CONTROLLED LITHIUM METAL COATING

INTRODUCTION

The present disclosure relates to a method of applying a porosity-controlled lithium metal coating to a substrate.

A coating is a covering that is applied to the surface of an object. The purpose of applying the coating may be decorative, functional, or both. The coating itself may be an all-over coating, completely covering the object, or it may only cover parts of the Object.

Functional coatings may be applied to change the surface properties of the object's material, such as adhesion, wettability, corrosion resistance, or wear resistance. In other cases, the coating adds a completely new property, and forms an essential part of the finished product.

A major consideration for most coating processes is that the coating is to be applied at a controlled thickness. Many industrial coating processes involve the application of a thin film of functional material to a substrate, such as paper, fabric, film, foil, or sheet stock. Coatings may be applied as liquids, gases, or solids in component or constituent particle form.

SUMMARY

A method of manufacturing a component having a porosity-controlled lithium metal coating includes setting up an aerosol spray apparatus having a material feeder and a confinement conduit in fluid communication therewith. The confinement conduit has an inlet end and a nozzle end. The method also includes setting up a substrate on a moveable tooling plate, wherein the substrate has an exposed surface, such that the nozzle end is directed at the exposed surface. The method additionally includes loading a lithium metal into the material feeder. The method also includes feeding a high-pressure gas into the inlet end of the confinement conduit to thereby form an aerosol spray of lithium metal. The method further includes moving the tooling plate to regulate a thickness and a pattern of deposition of at least a portion of the lithium metal onto the exposed surface through the nozzle end to thereby generate a porous, i.e., porosity-controlled, lithium metal coating on the substrate.

The substrate may be a current collector for a lithium-ion battery cell. Such a current collector may have a thickness of 8-10 microns.

According to the method, generating the porous lithium metal coating on the substrate prelithiates or generates a lithium-ion battery electrode.

Material of the substrate may be silicon. Alternatively, material of the substrate is one of copper, nickel, and graphite.

The high-pressure gas is configured to not react chemically with lithium metal. For example, the high-pressure gas may be argon.

The lithium metal may be loaded into the material feeder in powder form.

The resultant thickness of the deposited porous lithium metal coating may be up to, i.e., equal to or less than, 50 microns.

According to the method, moving the tooling plate to regulate the thickness and the pattern of the deposition may be accomplished by a mechanism regulated via an electronic controller.

The aerosol spray apparatus may also include a bypass conduit and directly connecting the inlet end and the nozzle end. The aerosol spray apparatus may additionally include a heat exchanger arranged in the bypass conduit and configured to adjust a temperature of the high-pressure gas entering the nozzle end. The aerosol spray apparatus may further include at least one bypass valve configured to select a flow rate of the high-pressure gas in each of the confinement conduit and the bypass conduit. In such an embodiment, the method may additionally include regulating the bypass valve(s), via the electronic controller, to select the flow rate of the high-pressure gas in each of the confinement conduit and the bypass conduit.

The aerosol spray apparatus may include two separate valves—a first valve arranged in the confinement conduit and a second valve arranged in the bypass conduit. In such an embodiment, the method may additionally include coordinating, via the electronic controller, operation of the first and the second valves to adjust the respective flow rates of the high-pressure gas in the confinement and bypass conduits.

The method may additionally include regulating, via the electronic controller, the temperature of the high-pressure gas in a range of −186° C. to 200° C.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 2 is a schematic illustration of an aerosol spray apparatus configured to generate a porosity-controlled lithium metal coating on the surface of a substrate, for use in manufacturing a component, such as the lithium anode shown in FIG. 1, according to the disclosure.

FIG. 3 is a schematic perspective close-up view of the anode, shown in FIG. 1, depicting the anode's porosity-controlled lithium metal coating structure, according to the disclosure.

DETAILED DESCRIPTION

Figure 1:
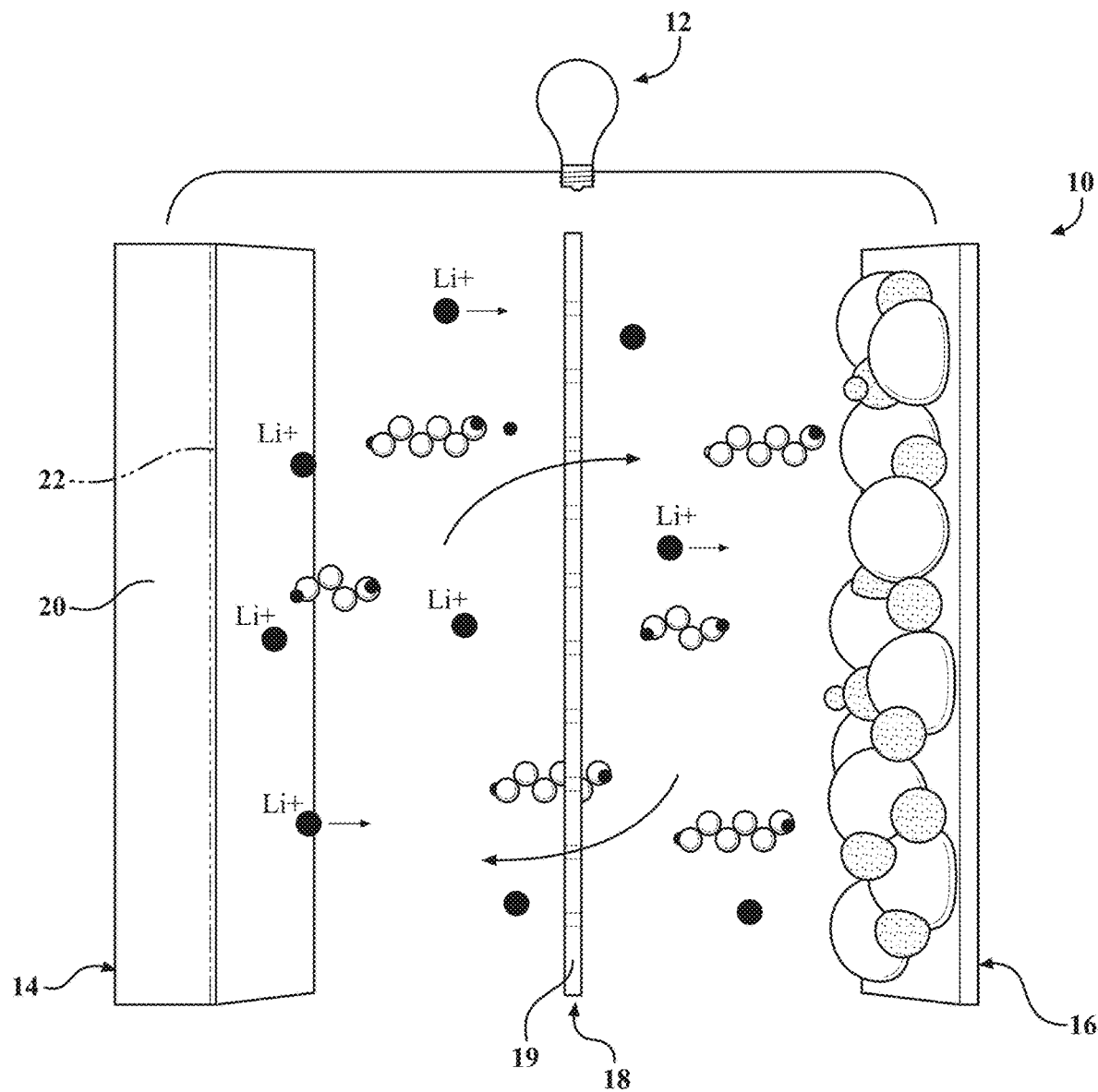
FIG. 1 is a schematic view of an electrical energy storage cell powering a load, the energy storage cell being shown as a lithium-ion (Li-Ion) battery having a lithium anode and a suitable cathode, according to the disclosure.
Figure 4:
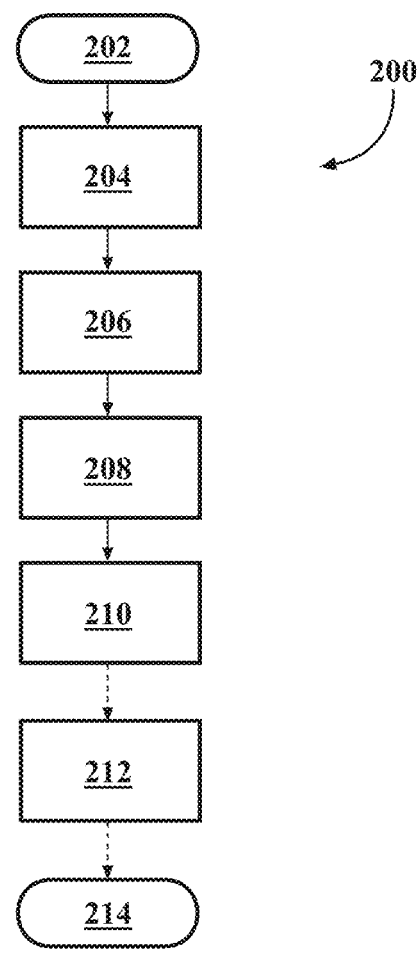
FIG. 4 illustrates a method of applying a spray-on porosity-controlled lithium metal coating to a substrate to manufacture a component, such as the lithium anode of the Li-Ion battery shown in FIGS. 1 and 3, using the aerosol spray apparatus shown in FIG. 2.

Referring to FIG. 1, an electrical energy storage cell 10 powering a load 12 is depicted. The electrical energy storage cell 10 is specifically shown as a lithium-ion (Li-Ion) battery having an anode (negative electrode) 14, a cathode (positive electrode) 16, and a non-aqueous electrolyte 18 surrounding the anode, cathode, and flowing through a separator diaphragm 19. The anode 14 may be constructed from lithium, graphite, silicon, silicon oxide and various other suitable material. While the cathode 16 is frequently constructed from sulfur, other Li ion battery cathode material, such as lithium manganese oxide, lithium iron phosphate, lithium nickel/manganese/cobalt oxide, or a variety of other suitable materials, may also be used. Li-Ion batteries are rechargeable electrochemical batteries notable for their high specific energy and low self discharge. The Li-Ion batteries may be used to power such diverse items as toys, consumer electronics, and motor vehicles. The subject vehicle may include, but not be limited to, a commercial vehicle, industrial vehicle, passenger vehicle, aircraft, watercraft, train or the like. It is also contemplated that the vehicle may be a mobile platform, such as an airplane, all-terrain vehicle (ATV), boat, personal movement apparatus, robot and the like to accomplish the purposes of the present disclosure.

In Li-Ion batteries, lithium ions move from the anode 14 through the electrolyte 18 to the cathode 16 during discharge, and back when charging. Li-Ion batteries use a lithium compound as the material at the positive electrode and typically graphite at the negative electrode. Generally, the reactants in the electrochemical reactions in a Li-Ion cell 10 are materials of anode and cathode, both of which are compounds that may host lithium atoms. During discharge, an oxidation half-reaction at the anode 14 produces positively charged lithium ions and negatively charged electrons. The oxidation half-reaction may also produce uncharged material that remains at the anode 14. Lithium ions move through the electrolyte 18, electrons move through an external circuit (including a connection to the electrical load 12 or to a charging device), and then they recombine at the cathode (together with the cathode material) in a reduction half-reaction. The electrolyte 18 and the external circuit provide conductive media for lithium ions and electrons, respectively, but do not partake in the electrochemical reaction.

Generally, during discharge of an electrochemical battery cell, electrons flow from the anode 14 toward the cathode 16 through the external circuit. The reactions during discharge lower the chemical potential of the cell, so discharging transfers energy from the cell to wherever the electric current dissipates its energy, mostly in the external circuit. During charging, the described reactions and transports go in the opposite direction: electrons move from the positive electrode to the negative electrode through the external circuit. To charge the cell, the external circuit has to provide electric energy. This energy is then stored (with some loss) as chemical energy in the cell. In a Li-Ion cell, both the anode 14 and cathode 16 allow lithium ions to move in and out of their structures via a process called insertion (intercalation) or extraction (deintercalation), respectively. Typically, the anode 14 employs a current collector 20, which may be manufactured from copper, with a graphite or silicon layer 22 used as active material or layer for intercalation of lithium ions. However, while the amount of lithium held by the active layer 22 is directly related to the performance of a Li-Ion battery, generally the capacity of the active layer 22 to intercalate lithium is limited by its material's molecular structure. A method to increase the amount of lithium held by the anode 14 would be beneficial to the performance of a Li-Ion battery cell 10. For example, an additional layer of lithium applied to the current collector 20 may provide increased cycling capacity for the Li-Ion battery cell 10.

A spray-on application of lithium metal may be generally employed to manufacture a variety of components, such as the anode 14 for the Li-Ion battery cell 10. An aerosol spray apparatus 100, shown in FIG. 2, may be used to deposit lithium metal directly onto a substrate, such as the current collector 20, to generate a porosity-controlled lithium metal coating 24 (shown in FIG. 3). The term "porosity-controlled" is herein used to indicate a porous lithium metal coating 24 with a generally consistent degree of porosity and magnitude of included pores. Although the apparatus 100 may be employed to manufacture a variety of components having a porosity-controlled lithium metal coating 24, for exemplary purposes, the subject apparatus will be described specifically with reference to the anode 14 for the Li-Ion battery cell 10 shown in FIG. 2. As shown, the aerosol spray apparatus 100 includes a material feeder 102 configured to accept a lithium metal 104. The lithium metal 104 will be supplied into the material feeder 102 in powder form. In such an embodiment, the material feeder 102 would be specifically configured as a powder material feeder. The aerosol spray apparatus 100 also includes a confinement conduit 106 in fluid communication with the powder material feeder 102. The confinement conduit 106 has an inlet end 106A and a nozzle end 106B. The nozzle end 106B may specifically incorporate a supersonic nozzle for spraying an aerosolized lithium metal 104.

Alternatively, the aerosol spray apparatus 100 may be configured as an arc sprayer or a nebulizer. A nebulizer may use the liquid lithium metal 104, either melted in the vessel or at the nebulizer's sprayer tip. Accordingly, in the nebulizer embodiment, the material feeder 102 may be configured to accept and supply lithium metal 104 into the confinement conduit 106 in either liquid or solid form. An arc sprayer may use the lithium metal 104 in either solid or liquid from. For example, the material feeder 102 used to supply solid lithium metal in wire form, and the lithium wire may be melted at the arc tip or directly with an arc. Accordingly, in such embodiments, the material feeder 102 may be configured to accept and supply lithium metal 104 into the confinement conduit 106 in either liquid or solid form.

The aerosol spray apparatus 100 also includes a moveable tooling plate 108 configured to accept the current collector 20. As shown, the aerosol spray apparatus 100 may employ a mechanism 110, such as an electric servomotor, operatively connected to the tooling plate 108 and configured to shift the tooling plate in a prescribed pattern. As shown, the aerosol spray apparatus 100 may further include an electronic controller 112 in operative communication with the mechanism 110. The electronic controller 112 may be a central processing unit (CPU) configured to regulate various functions on the aerosol spray apparatus 100 or a dedicated electronic control unit (ECU) having a microprocessor for controlling the mechanism 110. The electronic controller 112 specifically includes a processor and tangible, non-transitory memory, which includes instructions programmed therein for processing data signals and executing commands. The memory may be an appropriate recordable medium that participates in providing computer-readable data or process instructions. Such a recordable medium may take many forms, including but not limited to non-volatile media and volatile media. Non-volatile media for the electronic controller 112 may include, for example, optical or magnetic disks and other persistent memory. Volatile media may include, for example, dynamic random-access memory (DRAM), which may constitute a main memory.

The instructions programmed into the electronic controller 112 may be transmitted by one or more transmission medium, including coaxial cables, copper wire and fiber optics, including the wires that comprise a system bus coupled to a processor of a computer, or via a wireless connection. Memory of the electronic controller 112 may also include a flexible disk, hard disk, magnetic tape, another magnetic medium, a CD-ROM, DVD, another optical medium, etc. The electronic controller 112 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Subsystems and algorithm(s), indicated generally via numeral 112A, required by the electronic controller 112 or accessible thereby may be stored in the memory of the controller and automatically executed to facilitate operation of the aerosol spray apparatus 100. The electronic controller 112 is specifically programmed to regulate operation of the mechanism 110 to affect a desired, preprogrammed pattern of deposition of the lithium metal powder 104 onto a substrate, e.g., the current collector 20.

As shown, the current collector 20 has an exposed surface 20A, suitably prepared (for example, but not limited to, cleaned, etched, abraded, burnished, electroplated, or coated) to accept one or more layers of the porosity-controlled lithium metal coating 24. The aerosol spray apparatus 100 is set up such that the nozzle end 106B of the confinement conduit 106 is directed at the exposed surface 20A. A high-pressure gas 114, is fed into the inlet end 106A of the confinement conduit 106 to thereby generate an aerosol spray of lithium metal 116 out of the nozzle end 106B. Velocity of the high-pressure gas 114 at the nozzle end 106B may be controlled by a flow rate of the gas and the size of the nozzle. When the aerosol spray of lithium metal 116 is activated, the tooling plate 108 is moved relative to the nozzle end 106B to regulate a thickness and a pattern of deposition of at least a portion of the lithium metal powder 104 onto the exposed surface 20A through the nozzle end 106B.

The pattern of deposition generated via the movement of the tooling plate 108 with the current collector 20 thereon may be serpentine or circular to assure thorough and substantially even coverage of the surface 20A. Such a pattern is intended to generate the porous, i.e., porosity-controlled, with a substantially uniform target thickness 118, lithium metal coating 24 layer on the substrate, e.g., the current collector 20. In addition to the moveable tooling plate 108, the apparatus may also include a moveable nozzle end 106B. In such an embodiment, the electronic controller 112 may be programmed to regulate and coordinate relative movement of both the tooling plate 108 and the nozzle end 106B. Specifically, the tooling plate 108 and the nozzle end 106B may be configured and regulated to shift relative to each other. For example, the substrate, e.g., the current collector 20, may be regulated to shift in one direction, while the nozzle end 106B is shifted in an opposite direction, to thereby maximize relative displacement between the two objects.

The aerosol spray apparatus 100 may additionally include a bypass conduit 120 fluidly and directly connecting the inlet end 106A and the nozzle end 106B. The apparatus 100 may additionally include a heat exchanger 122 arranged in the bypass conduit 120. The heat exchanger 122 may include an element (not shown), such as a fluid tube/coil or an electric device, configured to adjust, either reduce or increase, the temperature of the high-pressure gas 114 entering the nozzle end 106B. The apparatus 100 may further include one or more bypass valves configured to select a flow rate and apportion the volume of the high-pressure gas 114 passed through the confinement conduit 106 and the bypass conduit 120. Specifically, as shown in FIG. 2. the apparatus 100 may include a first valve 124 arranged in the confinement conduit 106 and configured to control the flow rate of the high-pressure gas 114 therethrough and a second valve 126 arranged in the bypass conduit 120 and configured to control the flow rate of the high-pressure gas conveyed therethrough. Alternatively, a single valve (not shown) may be arranged at a junction 128 between the confinement and the bypass conduits 106, 120.

The electronic controller 112 may be programmed to regulate the bypass valve(s) 124, 126 to select or adjust the flow rate of the high-pressure gas 114 in each of the confinement conduit and the bypass conduits 106, 120. In the embodiment of the apparatus 100 having each of the valves 124, 126, the electronic controller 112 may be programmed to coordinate operation of the subject first and the second valves 124, 126. The aerosol spray apparatus 100 may also include a thermostat 130 in communication with the electronic controller 112 and configured to detect a temperature of the high-pressure gas 114 in the bypass conduit 120. The electronic controller 112 may be programmed to regulate the temperature of the high-pressure gas 114 in the bypass conduit 120, using data received from the thermostat 130. Temperature range of the high-pressure gas 114 conveyed through the bypass conduit 120 may be regulated in the −186° C. to 200° C. range specifically to make the apparatus 100 operable with the lithium metal 104.

A method 200 of manufacturing a component having a porosity-controlled lithium metal coating 24 is depicted in FIG. 4 and disclosed in detail below. Method 200 is generally intended for applying a layer of lithium metal to a substrate (shown in FIG. 3), such as the current collector 20 for the Li-Ion battery cell 10 described with respect to FIG. 1, and employs the aerosol spray apparatus 100 shown in FIG. 2. Method 200 commences in frame 202 with setting up the aerosol spray apparatus 100 (shown in FIG. 2). Following frame 202, the method advances to frame 204 and then to frame 206. Interchangeably, either in frame 204 or in frame 206, the method includes setting up and arranging the substrate, e.g., the current collector 20, on the moveable tooling plate 108, such that the nozzle end 106B is directed at the exposed surface 20A. Of note, either copper or nickel may be used for the substrate of the current collector 20 of the Li-Ion battery cell 10, with silicon or graphite coated onto the copper or nickel current collector. Additionally, lithium may be coated directly on the current collector to form a lithium metal anode, while lithium coated onto graphite or silicon (or silicon oxide) may be used for prelithiating the anode. The current collector 20 may have a thickness in the range of 8-10 microns. In frame 204 or in frame 206, the method also includes loading a lithium metal 104 into the material feeder 102. As noted above with respect to FIG. 2, the material feeder 102 may be specifically configured as a powder feeder, such that the lithium metal 104 is loaded into the material feeder in powder form.

From frame 206, the method moves on to frame 208, where the method includes feeding the high-pressure gas 114 into the inlet end 106A of the confinement conduit 106 to thereby form the aerosol spray of lithium metal 116. The high-pressure gas 114 may specifically be a noble gas, such as Argon, configured to not react chemically with the lithium metal 104 inside the aerosol spray apparatus 100. From frame 208, the method moves on to frame 210, where the method includes moving or shifting the tooling plate 108, such as via the mechanism 110, to regulate the thickness and the pattern of deposition of at least a portion of the lithium metal 104 onto the exposed surface 20A through the nozzle end 106B, as discussed above with respect to FIG. 2. According to the method, the specifically prescribed movement of the tooling plate 108, as, for example, programmed into the electronic controller 112, is intended to generate the substantially uniform target thickness 118 porosity-controlled lithium metal coating 24 on the substrate, e.g., the current collector 20.

In each of the frames 208 and 210, the method may include regulating, via the electronic controller 112, the bypass valve(s) 124, 126 to select the flow rate of the high-pressure gas 114 in each of the confinement conduit and the bypass conduits 106, 120. Also, in frames 208 and 210, the method may include regulating, via the electronic controller 112, the temperature of the high-pressure gas 114 in the bypass conduit 120, using the data received from the thermostat 130, as described above with respect to FIG. 2. After frame 210, the method may proceed to frame 212. In frame 212, the substrate including the porosity-controlled lithium metal coating 24 may be permitted to cool for a prescribed duration of time.

Multiple successive layers of the lithium metal 104 may be deposited onto the surface 20A, such as during frames 208-210, using varied gas flow rates, pressures, and temperatures, to achieve the desired target thickness 118 of the lithium metal coating 24. Specifically, the lithium metal 104 may be initially applied to the substrate at a comparatively higher flow rate to achieve a higher density base coat, and then applied at a comparatively lower flow rate to achieve a top coat with controlled porosity. The target thickness 118 may be up to, i.e., equal to or less than, 50 microns. The deposition of the lithium material 104 on the substrate surface 20A may be regulated via controlling duration of time the method is run in frames 208-210.

In the embodiment of the Li-Ion battery cell 10 current collector 20, such generation of the porosity-controlled lithium metal coating 24 may be employed to "prelithiate", i.e., effectively pre-charge, the lithium-ion battery anode 14 and mitigate non-recoverable loss of lithium during initial cycling of the battery cell 10. Prelithiating the lithium-ion battery anode 14 may be accomplished by depositing lithium metal over the graphite or silicon layer 22 of the substrate, which may be deposited on the surface 20A of the current collector 20 in advance of commencing the method. Accordingly, prelithiating may augment graphite's or silicon's capacity of the anode 14 to retain lithium and may increase cycle capacity of the Li-Ion battery cell 10 by as much as 50%. The method may conclude in frame 214 with the completion of the generated component, e.g., the anode 14, having the porosity-controlled lithium metal coating 24 deposited onto the surface 20A of the substrate or current collector 20.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of manufacturing a component having a porosity-controlled lithium metal coating, the method comprising:
    setting up an aerosol spray apparatus having a material feeder and a confinement conduit in fluid communication therewith, wherein the confinement conduit has an inlet end and a nozzle end;
    setting up a substrate on a moveable tooling plate, wherein the substrate has an exposed surface, such that the nozzle end is directed at the exposed surface;
    loading a lithium metal into the material feeder;
    feeding a high-pressure gas into the inlet end of the confinement conduit to thereby form an aerosol spray of lithium metal; and
    moving the tooling plate to regulate a thickness and a multi-directional pattern of deposition of at least a portion of the lithium metal onto the exposed surface through the nozzle end to thereby generate a porous lithium metal coating on the substrate.

2. The method of claim 1, wherein the substrate is a current collector for a lithium-ion battery cell, and wherein the current collector has a thickness of 8-10 microns.

3. The method of claim 2, wherein a material of the substrate is one of copper, nickel, silicon, and graphite.

4. The method of claim 1, wherein the high-pressure gas is a noble gas configured to not react chemically with lithium metal.

5. The method of claim 1, wherein the lithium metal is loaded into the material feeder in powder form.

6. The method of claim 1, wherein the porous lithium metal coating has a resultant thickness of up to 50 microns.

7. The method of claim 1, wherein moving the tooling plate to regulate the thickness and the pattern of the deposition is accomplished by a mechanism regulated via an electronic controller.

8. The method of claim 7, wherein the aerosol spray apparatus additionally includes:
    a bypass conduit fluidly and directly connecting the inlet end and the nozzle end;
    a heat exchanger arranged in the bypass conduit and configured to adjust a temperature of the high-pressure gas entering the nozzle end; and
    at least one bypass valve configured to select a flow rate of the high-pressure gas in each of the confinement conduit and the bypass conduit;
    the method further comprising regulating the at least one bypass valve, via the electronic controller, to select the flow rate of the high-pressure gas in each of the confinement conduit and the bypass conduit.

9. The method of claim 8, wherein the at least one bypass valve includes a first valve arranged in the confinement conduit and a second valve arranged in the bypass conduit, the method further comprising coordinating, via the electronic controller, operation of the first and the second valves to adjust the respective flow rates of the high-pressure gas in the confinement and bypass conduits.

10. The method of claim 8, the method further comprising regulating, via the electronic controller, the temperature of the high-pressure gas in a range of −186° C. to 200° C.

11. A method of applying a porosity-controlled lithium metal coating onto a current collector of a Lithium-ion battery cell, the method comprising:
    setting up an aerosol spray apparatus having a powder material feeder and a confinement conduit in fluid communication therewith, wherein the confinement conduit has an inlet end and a nozzle end;

setting up the current collector on a moveable tooling plate, wherein the current collector has an exposed surface, such that the nozzle end is directed at the exposed surface;

loading a lithium metal powder into the powder material feeder;

feeding a high-pressure gas into the inlet end of the confinement conduit to thereby form an aerosol spray of lithium metal; and moving the tooling plate to regulate a thickness and a multi-directional pattern of deposition of at least a portion of the lithium metal aerosol spray onto the exposed surface through the nozzle end to thereby generate a porous lithium metal coating on the current collector.

12. The method of claim 11, wherein the current collector has a thickness of 8-10 microns.

13. The method of claim 11, wherein a material of the current collector is one of copper, nickel, silicon, and graphite.

14. The method of claim 11, wherein the high-pressure gas is a noble gas configured to not react chemically with lithium metal.

15. The method of claim 11, wherein the porous lithium metal coating has a resultant thickness of up to 50 microns.

16. The method of claim 11, wherein moving the tooling plate to regulate the thickness and the pattern of the deposition is accomplished by a mechanism regulated via an electronic controller.

17. The method of claim 16, wherein the aerosol spray apparatus additionally includes:

a bypass conduit fluidly and directly connecting the inlet end and the nozzle end;

a heat exchanger arranged in the bypass conduit and configured to adjust a temperature of the high-pressure gas entering the nozzle end; and at least one bypass valve configured to select a flow rate of the high-pressure gas in each of the confinement conduit and the bypass conduit;

the method further comprising regulating the at least one bypass valve, via the electronic controller, to select the flow rate of the high-pressure gas in each of the confinement conduit and the bypass conduit.

18. A method of applying a porosity-controlled lithium metal coating onto a current collector of a Lithium-ion battery cell, the method comprising:

setting up an aerosol spray apparatus having a powder material feeder and a confinement conduit in fluid communication therewith, wherein the confinement conduit has an inlet end and a nozzle end;

setting up the current collector on a moveable tooling plate, wherein the current collector has an exposed surface, such that the nozzle end is directed at the exposed surface;

loading a lithium metal powder into the powder material feeder;

feeding a high-pressure gas into the inlet end of the confinement conduit to thereby form an aerosol spray of lithium metal; and moving the tooling plate, via a mechanism regulated by an electronic controller having a non-transitory computer-readable medium with executable instructions stored thereon, to regulate a thickness and a multi-directional pattern of deposition of at least a portion of the lithium metal powder onto the exposed surface through the nozzle end to thereby generate a porous lithium metal coating on the current collector.

19. The method of claim 18, wherein moving the tooling plate to regulate the thickness and the pattern of the deposition is accomplished by a mechanism regulated via the electronic controller.

20. The method of claim 18, wherein the aerosol spray apparatus additionally includes:

a bypass conduit fluidly and directly connecting the inlet end and the nozzle end;

a heat exchanger arranged in the bypass conduit and configured to adjust a temperature of the high-pressure gas entering the nozzle end; and at least one bypass valve configured to select a flow rate of the high-pressure gas in each of the confinement conduit and the bypass conduit;

the method further comprising regulating the at least one bypass valve, via the electronic controller, to select the flow rate of the high-pressure gas in each of the confinement conduit and the bypass conduit.

* * * * *